(12) United States Patent
Kersey et al.

(10) Patent No.: US 12,317,938 B2
(45) Date of Patent: Jun. 3, 2025

(54) EMBEDDED CONNECTIVITY

(71) Applicant: Nicoventures Trading Limited, London (GB)

(72) Inventors: Robert Kersey, London (GB); Darryl Baker, London (GB); Patrick Moloney, London (GB)

(73) Assignee: NICOVENTURES TRADING LIMITED, London (GB)

( * ) Notice: Subject to any disclaimer, the term of this patent is extended or adjusted under 35 U.S.C. 154(b) by 758 days.

(21) Appl. No.: 17/309,749

(22) PCT Filed: Dec. 17, 2019

(86) PCT No.: PCT/GB2019/053571
§ 371 (c)(1),
(2) Date: Jun. 17, 2021

(87) PCT Pub. No.: WO2020/128448
PCT Pub. Date: Jun. 25, 2020

(65) Prior Publication Data
US 2022/0000183 A1    Jan. 6, 2022

(30) Foreign Application Priority Data
Dec. 17, 2018    (GB) ..................................... 1820558

(51) Int. Cl.
*A24F 40/65*    (2020.01)
*A24F 40/53*    (2020.01)
(Continued)

(52) U.S. Cl.
CPC .............. *A24F 40/65* (2020.01); *A24F 40/53* (2020.01); *A24F 40/90* (2020.01); *H02J 7/0045* (2013.01); *H02J 7/0048* (2020.01)

(58) Field of Classification Search
CPC ... H04W 8/005; H04W 4/80; H04W 36/0069; H04W 76/20; H04W 84/18;
(Continued)

(56) References Cited

U.S. PATENT DOCUMENTS 9,942,849 B1\*   4/2018   Hariharan ............... H04W 4/80
2011/0265806 A1   11/2011   Alarcon et al.
(Continued)

FOREIGN PATENT DOCUMENTS

CN    204012951 U    12/2014
CN    207041527 U    2/2018
(Continued)

OTHER PUBLICATIONS

Notice of Issuance issued in corresponding Chinese Patent Application No. 201980083506.4 mailed Mar. 26, 2024, all pages cited in its entirety.
(Continued)

*Primary Examiner* — Lana N Le
(74) *Attorney, Agent, or Firm* — Burr & Forman LLP

(57) ABSTRACT

There can be provided an electronic nicotine delivery "END" device comprising: a wireless local area network "WLAN" or wireless telecommunications connectivity interface configured to establish a wireless data connection to a wireless local area network access point to provide data connectivity from the END device to a remote management service, and a charging connector configured to receive power input for recharging a power source of the END device. The END device also comprises circuitry configured to selectively activate the connectivity interface in response to expected or ongoing receipt of power via the charging connector.

19 Claims, 6 Drawing Sheets

(51) Int. Cl.
*A24F 40/90* (2020.01)
*H02J 7/00* (2006.01)

(58) Field of Classification Search
CPC ............. H04W 52/0216; H04W 48/16; H04W 36/0055; H04W 88/08; H04W 88/06; H04W 48/18; H04W 48/20; H04W 76/15; H04W 84/12; A24F 40/65; A24F 40/53; A24F 40/90; A24F 40/50; A24F 40/60; A24F 40/10; A24F 40/20; A24F 40/40; A24F 40/42; A24F 40/30; A24F 47/00; H02J 7/0045; H02J 7/0048; H02J 7/00; A24B 15/243; A24B 15/167
See application file for complete search history.

(56) References Cited

U.S. PATENT DOCUMENTS

| | | | |
|---|---|---|---|
| 2013/0284192 | A1 | 10/2013 | Peleg et al. |
| 2013/0319439 | A1* | 12/2013 | Gorelick ............... A24F 40/65 131/329 |
| 2013/0340775 | A1 | 12/2013 | Juster et al. |
| 2014/0174459 | A1 | 6/2014 | Burstyn |
| 2015/0142387 | A1 | 5/2015 | Alarcon et al. |
| 2015/0352969 | A1 | 12/2015 | Ando et al. |
| 2016/0029697 | A1 | 2/2016 | Shafer |
| 2017/0013487 | A1* | 1/2017 | Skaaksrud ............ H04W 84/18 |
| 2017/0040804 | A1* | 2/2017 | Hu ........................ H02J 7/0071 |
| 2017/0188627 | A1 | 7/2017 | Sur |
| 2017/0215485 | A1 | 8/2017 | Zitzke |
| 2018/0062380 | A1 | 3/2018 | Sorin et al. |
| 2018/0271155 | A1 | 9/2018 | Baker et al. |
| 2018/0289907 | A1 | 10/2018 | Marmur et al. |
| 2018/0292846 | A1* | 10/2018 | Henry .................... H04W 4/80 |
| 2018/0296779 | A1 | 10/2018 | Takeuchi et al. |
| 2020/0313446 | A1* | 10/2020 | Park ....................... H02J 7/0045 |
| 2023/0074424 | A1* | 3/2023 | Gamygin ................ A24F 40/53 |
| 2023/0307915 | A1* | 9/2023 | Sabag ..................... H02J 7/0071 |
| 2024/0020089 | A1* | 1/2024 | Gossain .................. H04W 4/80 |

FOREIGN PATENT DOCUMENTS

| | | |
|---|---|---|
| DE | 202013009601 U1 | 1/2014 |
| EP | 2537548 A2 | 12/2012 |
| JP | 2018527904 A | 9/2018 |
| JP | 2018533923 A | 11/2018 |
| RU | 2638514 C2 | 12/2017 |
| RU | 2644314 C2 | 2/2018 |
| WO | 2007095093 A2 | 8/2007 |
| WO | 2014081054 A1 | 5/2014 |
| WO | 2017055793 A1 | 4/2017 |
| WO | WO2017055803 A1 | 4/2017 |
| WO | 2017125878 A1 | 7/2017 |
| WO | 2018087738 A1 | 5/2018 |

OTHER PUBLICATIONS

Office Action issued in corresponding Canadian Patent Application No. 3,123,778 mailed May 1, 2024, all pages cited in its entirety.
International Search Report and Written Opinion, International Application No. PCT/GB2019/053571, mailing date Dec. 17, 2019, 16 pages.
International Preliminary Report on Patentability, International Application No. PCT/GB2019/053571, mailing date Dec. 17, 2018, 16 pages.
XDA Developers Forum Entitled|[Q] Automatically turn on WiFi Only when charging?|posted by kingkeld on Apr. 3, 2011.
Office Action from corresponding Russian Application No. 2021117485 mailed Dec. 24, 2021, all pages cited in its entirety.
Office Action from corresponding Russian Application No. 2023118384 mailed Dec. 1, 2023, all pages cited in its entirety.

* cited by examiner

EMBEDDED CONNECTIVITY

PRIORITY CLAIM

The present application is a National Phase entry of PCT Application No. PCT/GB2019/053571, filed Dec. 17, 2019, which claims priority from Great Britain Patent Application No. 1820558.3, filed Dec. 17, 2018, each of which is hereby fully incorporated herein by reference.

TECHNICAL FIELD

The present disclosure relates to embedded connectivity and in particular but not exclusively to an electronic nicotine delivery device and method with selectively activatable connectivity functionality.

BACKGROUND

Known electronic delivery "END" devices may provide for on-demand provision of an inhalable aerosol containing nicotine. Such END devices may be provided with a wireless communication interface for communicating data gathered in the device to an external base station or dock.

Examples of known approaches are described in US20160029697, DE202013009601U1, US2013/0284192, US2014/0174459, US2011/0265806, US2013/0340775, and a post from the XDA developers forum entitled "[Q] Automatically turn on WiFi ONLY when charging?" posted by kingkeld on 3 Apr. 2011.

SUMMARY

Some specific aspects and embodiments are set out in the appended claims.

Viewed from a first aspect, there can be provided an electronic nicotine delivery "END" device comprising: a wireless local area network "WLAN" or wireless telecommunications connectivity interface configured to establish a wireless data connection to a wireless local area network access point to provide data connectivity from the END device to a remote management service; a charging connector configured to receive power input for recharging a power source of the END device; and circuitry configured to selectively activate the connectivity interface in response to expected or ongoing receipt of power via the charging connector. Thus it is provided that an END device may have controllable power consumption so as to provide that a relatively simple END device can directly connect to the Internet and transmit data when a power source is effectively unlimited or is predicted to be sufficient for primary functionality of the device.

Viewed from a further aspect there can be provided a method of operating an END device comprising a wireless local area network "WLAN" or wireless telecommunications connectivity interface configured to establish a wireless data connection to a WLAN or wireless telecommunications network to provide data connectivity from the END device to a remote management service, the method comprising: receiving, via a charging connector, a power input for recharging a power source of the END device; and selectively activating the connectivity interface in response to ongoing receipt of power via the charging connector. Thereby, power may be preserved for END functionality in that battery depletion by data transmission is avoided.

Viewed from another aspect, there can be provided a method of operating an END device comprising a wireless local area network "WLAN" or wireless telecommunications connectivity interface configured to establish a wireless data connection to a WLAN or wireless telecommunications network to provide data connectivity from the END device to a remote management service, the method comprising: determining an expected time for receiving, via a charging connector, a power input for recharging a power source of the END device; and selectively activating the connectivity interface in response to determining that power consumption caused by activation of the connectivity interface will be replenished at the expected time prior to depletion of the power source by use of the connectivity interface and END usage of the END device. Thereby, power may be preserved for END functionality in that draw on a power supply for by data transmission is controlled to avoid over-depletion of that power supply.

View from a further aspect, there can be provided a method of managing an END device, the method comprising: detecting or predicting application of a charging power supply to the END device to cause the END device to activate a power-supply-presence-dependent wireless local area network "WLAN" or wireless telecommunications connectivity interface of the END device; responsive to detecting or predicting application of a charging power, activating the connectivity interface to detect whether the END device is located within a coverage range of a WLAN or wireless telecommunications network, the network providing data connectivity to remote management service; permitting the END device to connect to the network when the connectivity interface is activated to enable the END device to connect to the remote management service to receive data from and/or provide data to the remote management service. Thereby, power may be preserved for END functionality in that draw on a power supply for by data transmission is controlled to retain enough charge to cover anticipated END functionality usage.

BRIEF DESCRIPTION OF THE DRAWINGS

Embodiments of the present teachings will now be described, by way of example only, with reference to accompanying drawings, in which.

Figure 1:
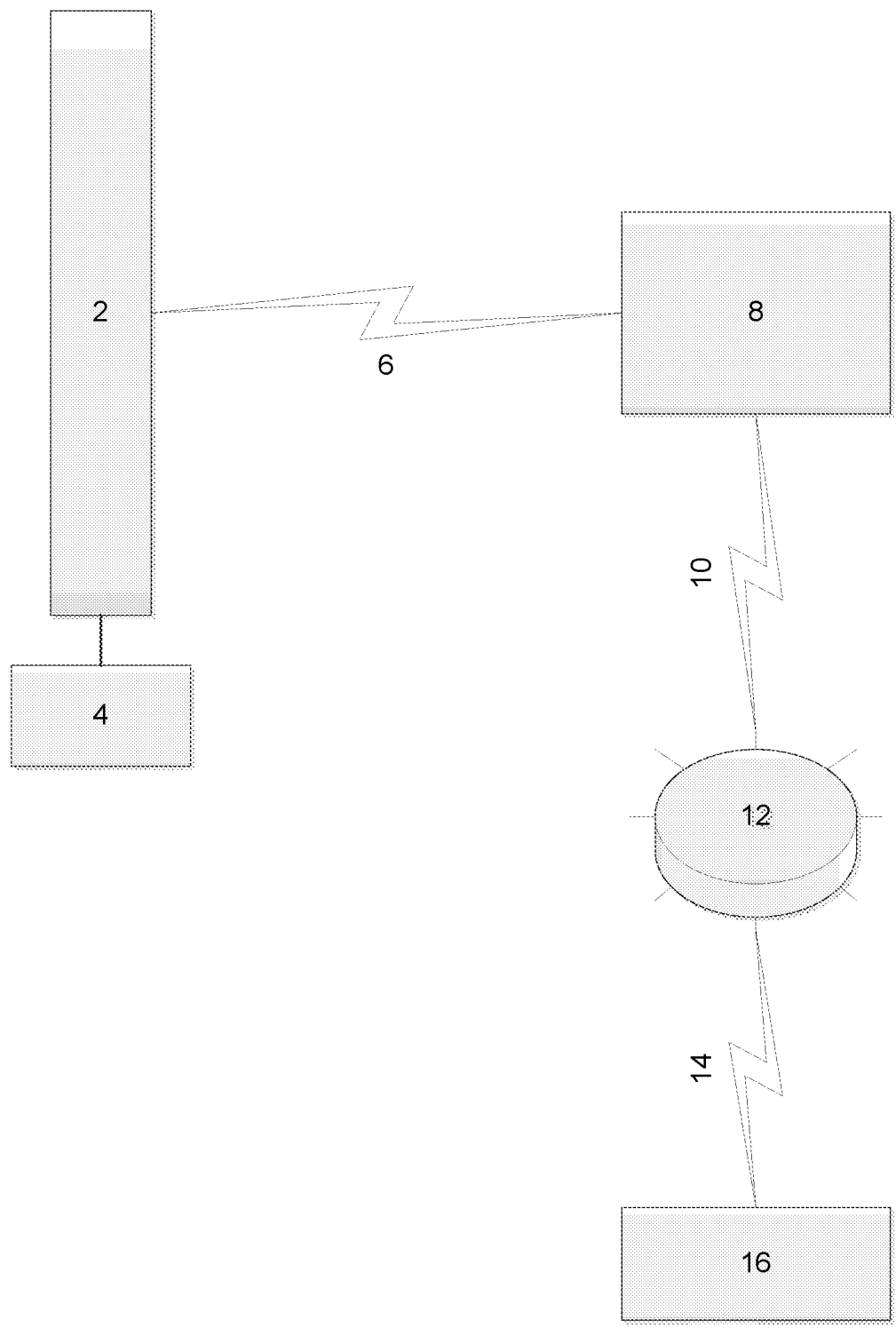
FIG. 1 provides a schematic illustration of connectivity to an END device.

While the presently described approach is susceptible to various modifications and alternative forms, specific embodiments are shown by way of example in the drawings and are herein described in detail. It should be understood, however, that drawings and detailed description thereto are not intended to limit the scope to the particular form disclosed, but on the contrary, the scope is to cover all modifications, equivalents and alternatives falling within the spirit and scope as defined by the appended claims.

DETAILED DESCRIPTION OF THE DRAWINGS

The present examples relate to providing data connectivity to/from an END device in such manner as to emphasize the primary device functionality (END functionality) as against power consumption caused by secondary functionality (data connectivity) in the device.

As illustrated in FIG. 1, according to the present approach an END device 2 is configured to be connected to receive charging power from a power supply 4. The supply of power from power supply 4 to the END device 2 may be wired (e.g. using a connector cable or a docking connector) or wireless (for example using inductive charging from a charging station, dock or housing).

The END device 2 is also configured to be connected via a data connection 6 to an access point 8. The access point 8 is in turn configured to communicate via a data connection 10 to a connectivity network 12. The connectivity network 12 is in turn configured to communicate via a data connection 14 to a remote service 16. The remote service 16 provides one or more services that the END device may require access to, for example an error condition logging service, a user account service or the like.

According to one envisaged implementation, the data connection 6 is a Wi-Fi connection (e.g. an IEEE802.11x connection) and the access point 8 is a Wi-Fi access point or router. The data connection 10 provides onward data connectivity to the network 12 which represents the Internet or part thereof. In another envisaged implementation, the data connection 6 is a wireless telecommunications connection (e.g. a 2G, GRPS, 3G, 3.5G, EDGE, 4G or 5G mobile telephony interface) and the access point 8 is a base station or access point for the wireless telecommunications network. The data connection 10 provides onward data connectivity through the telecommunications network to the network 12 which represents the Internet or part thereof. In some implementations, the network 12 may alternatively represent a private network such as a WAN.

As will be appreciated from the examples of connectivity provided, the connectivity types are relatively long range data connectivity options than permit access to a data infrastructure for ultimately reaching the remote service. As will also be appreciated, the connectivity types are relatively high power draw (for example when compared to personal area networking technologies such as Bluetooth™, BTLE™ or Zigbee™). Thus the approach of the present examples provides a mechanism for managing power utilization using these relatively high power connectivity interfaces in such manner as to avoid causing data connectivity depleting the power reserves of a power source (e.g. battery) within the END device to a level where END functionality becomes impeded or prevented.

Figure 2:
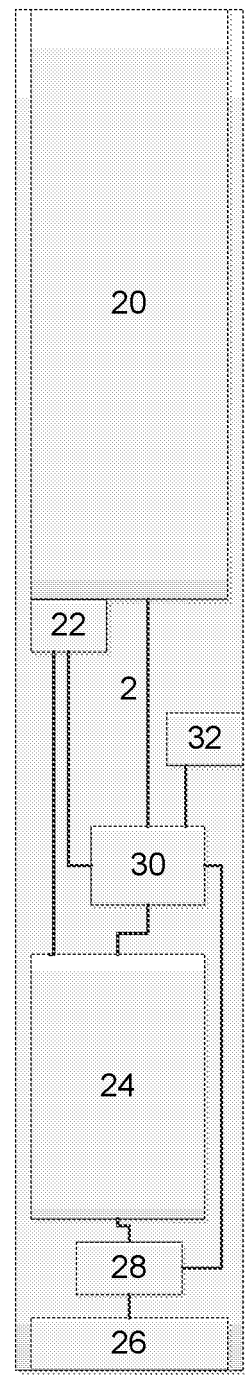
FIG. 2 provides a schematic illustration of an END device.

FIG. 2 provides a schematic illustration of components within the END device 2. AN END module 20 with configuration to generate an aerosol containing nicotine upon activation. The END module may be configured to generate the aerosol by evaporation of a nicotine-containing liquid into an airstream using a heater. The aerosol containing nicotine is then delivered to a user via a mouthpiece of the END device 2. Activation of the END module is caused using an activation switch 22. The activation switch may be a physically switch or button accessible at the surface of the END device 2 to facilitate a manual activation, or may alternatively be a switch configured to detect intended usage of the END device 2 for example a pressure switch configured to detect an airflow to or through the END module 20 caused by a user commencing inhalation through the mouthpiece. In some examples, the activation switch 22 may be integrated into the END module 20. In some implementations, the END module may be made up of multiple sub-modules, such as separate aerosol generation and nicotine-containing liquid reservoir modules.

As also show in FIG. 2, a power source 24 (such as a battery) is provided in the END device. The power source 24 is connected to power the END module 20 via the activation switch 22. To provide that a store of electrical power within the power source 24 can be replenished, a charging connector 26 is provided, configured to receive electrical power from an electrical power supply (for example power supply 4 shown in FIG. 1). As mentioned above the power maybe provided via a wired connector (such as a cable connector or a dock connector). In this case, the charging connector 26 includes a physical connector corresponding to the wired supply. As also mentioned above, the power may be provided by a wireless provision (for example an inductive charging station, dock or housing). In this case, the charging connector 26 includes a wireless charging receiver corresponding to the wireless supply. In some examples, an END device may be provided with both wired and wireless charging connectors, and/or may be provided with multiple wired connectors conforming to different power supply connector formats.

Upon receipt of charging power by the charging connector 26, a charging module 28 causes charging of the power source 24 to be performed. The charging module 28 provides for controlled charging of the power source 24 according to any applicable power source management guidance of the power source 24, for example providing a charging rate to maximize battery life and/or providing overcharge protection. In some examples, the charging module 28 may be integrated into the charging connector 26 or the power source 24.

As further illustrated in FIG. 2, the charging module 28 is also connected to control circuitry 30. The control circuitry 30 is further connected to a wireless connectivity interface 32, such as a wireless local area network "WLAN" or wireless telecommunications connectivity interface. Where the connectivity interface 32 is a WLAN connectivity interface, this may comprise a Wi-Fi interface (e.g. an IEEE802.11x connection). Where connectivity interface 32 is a wireless telecommunications connectivity interface comprises a wireless telephony connectivity interface (e.g. a 2G, GRPS, 3G, 3.5G, EDGE, 4G or 5G mobile telephony interface). The connectivity interface may in some implementations include both WLAN and wireless telecommunications functionality. The control circuitry 30 is configured to activate the connectivity interface 32 in response to actual or expected receipt of charging power at the charging connector 26. Determination of actual receipt of charging power at the charging connector 26 may be provided by the connection from the charging module 28. Determination of expected receipt of charging power at the charging connector 26 may be provided by one or more determinations by the control circuitry 30, as will be explained further below. The control circuitry may be provided by one or more elements capable of performing control tasks based upon a variety of inputs, such as a microprocessor, a microcontroller, an application-specific integrated circuit, and/or discrete analog and/or digital circuit elements.

The control circuitry 30 of the present example is further connected to the END module 20, activation switch 22 and power source 24. By way of these connections (some of which may be omitted in different examples), the control circuitry 30 may collect information from and/or provide a control input to any of the elements or modules to which it is connected. For example, the connection to the activation switch 22 may provide for the control circuitry to count a number of activations of the END module, durations of individual activations of the END module, read or set the sensitivity of the activation switch 22 and/or the like. Also, for example, connection to the END module 20 may provide for the control circuitry 30 to read or set the current heater power of a heater within the END module 20, read a current reserve of nicotine-containing fluid within the END module, and/or the like. Further, for example, connection to the power source 24 may provide for the control circuitry 30 to read a power reserve level.

The control circuitry 30 may store data gathered from the various connected elements and modules for transmission to a remote service, for example remote service 16 shown in FIG. 1. The control circuitry may also store current settings for controllable parameters of the various connected elements and modules. When the END device uses the connectivity interface 32 to access the remote service, any gathered data and/or stored current settings may be transmitted to the remote service and/or the remote service may provide updates for the current settings.

Communication between the connectivity interface 32 of the END device 2 and the remote service 16 may use conventional communications protocols associated with WLAN and/or telecommunications networks, compatible with the eventual transmission via the Internet (or a WAN) to the remote service 16. The encoding of data for transmission over a data link established using those protocols may be end-to-end encrypted to provide data security. Additionally or alternatively the data may be encoded in a proprietary format that anonymizes or obscures potentially identifying or confidential information conveyed by the data.

In some examples, the connectivity interface 32 is configured to permit connections only to only to preconfigured networks, e.g. networks for which access details are prestored by the END device (for example stored by the control circuitry 30 or the connectivity interface 32. This may provide that data connections are provided only over known (e.g. trusted) networks. In examples where the connectivity interface 32 includes a WLAN interface, the WLAN interface may be activatable in an access point mode. In this mode, the END device may be able to interface wirelessly with a computing device, as illustrated in FIG. 3.

Figure 3:
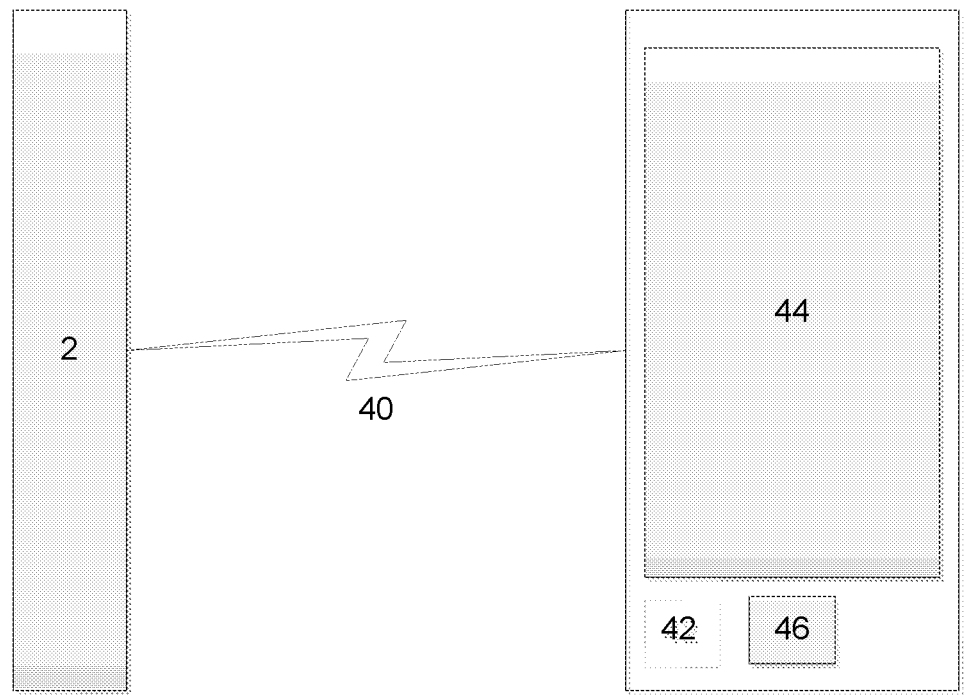
FIG. 3 provides a schematic illustration of connectivity in an access point mode.

As shown in FIG. 3, the END device 2 (with the connectivity interface 32 in a WLAN access point mode) can connect via a data connection 40 to a WLAN-enabled computing device 42. The computing device may for example be a desktop computer, a laptop computer, a tablet computer, a phablet device or a smartphone device. The computing device 42 includes a user interface display 44 and may include one or more buttons 46. The user interface display 44 may additionally (or alternatively to providing any buttons 46) be a touch-sensitive input device. The user interface display 44 and any buttons and/or touch-sensitive input device may be used to connect to a WLAN network broadcast from the END device connectivity interface operating in WLAN access point mode, and then display a user interface provided by the END device for use in the access point mode. The user interface may be used to preconfigure settings for WLAN and/or wireless telecommunications networks that may be used for connecting to the remote service 16.

Figure 4:
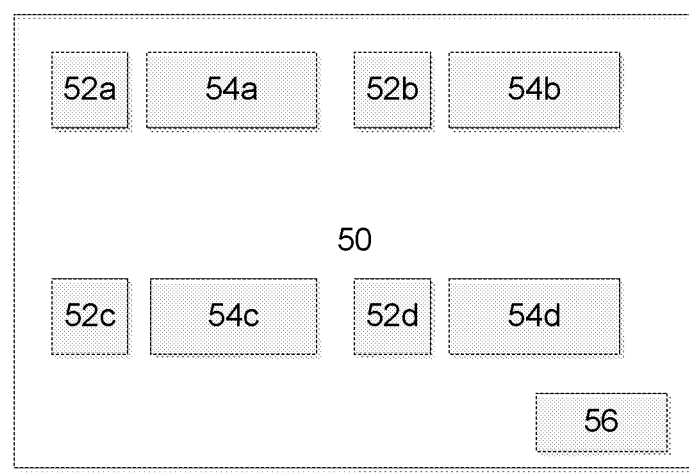
FIG. 4 provides a schematic illustration of a user interface.

An example user interface 50 that may be provided from the END device for display at the user interface display 44 of the computing device 42 is illustrated in FIG. 4. This example user interface 50 includes multiple field labels 52 (52a, 52b, 52c, 52d) and multiple corresponding field data areas 54 (54a, 54b, 54c, 54d) into which data for the respective field 52 may be entered. For example if configuring for access to a WLAN such as an IEEE802.11x network, the field label 52a may be SSID and the field data are 52a can be used to enter the SSID of the intended network for which the END device is being configured. Similarly other field may relate to username, password, other forms of network identifier, security type settings, or the like. The number of field labels and field data areas may vary depending according to the type of network being configured. The illustrated user interface also includes a save or enter selector 56, which can be activated to complete the network preconfiguration. Entry of data into the field data areas 54 and selection of the save selector 56 may be effected using the controls of the particular computing device 42. The user interface may also present multiple sets of fields and data areas, either all on a single page or on multiple navigable pages, for preconfiguration of multiple different networks. Thus the END device may be connectable to a variety of networks, for example corresponding to multiple different expected usage locations for the END device.

In some examples, the END device may include functionality for a personal area network data connection such as Bluetooth™, BTLE™ or Zigbee™. Such functionality may be provided by the connectivity interface 32 or a separate additional connectivity interface. Such a personal area network data connection may be use to present a user interface for preconfiguration of the WLAN and/or wireless telecommunications network instead of (or additionally to) presenting such an interface using an access point mode of the connectivity interface.

Where an approach is used to permit preconfiguration of the END device for one or more wireless networks, the END device may be limited to only permit a data connection to the remote service to be made using the preconfigures WLAN and/or telecommunications networks(s).

Using an END device such as described above, various intelligent power management techniques may be deployed. In the present examples, the END device has a primary functionality of delivery of an electronically generated nicotine-containing output. Thus the END device utilizes power management to preserve power for this primary functionality. In addition, the END device has a secondary functionality to provide remote data access for delivery and reception of data relating operation and/or configuration of the device, such as logging data, error condition data, settings data and/or utilization data. The performance of this remote data access functionality relies upon a wireless connectivity interface which utilizes a di stance communication technology such as WLAN or wireless telecommunications technology. Such distance communication technologies tend to require relatively high power consumption in comparison to intermittent activation of a small heating element in and END module used to evaporate small quantities of a nicotine-containing fluid. Thus the power management approach of the present examples is directed to controlling activation of the wireless connectivity interface to manage power consumption in such manner as to reduce or minimize the risk of excessive power consumption for the secondary functionality of remote data access causing unavailability of power for the primary functionality.

Figure 5:
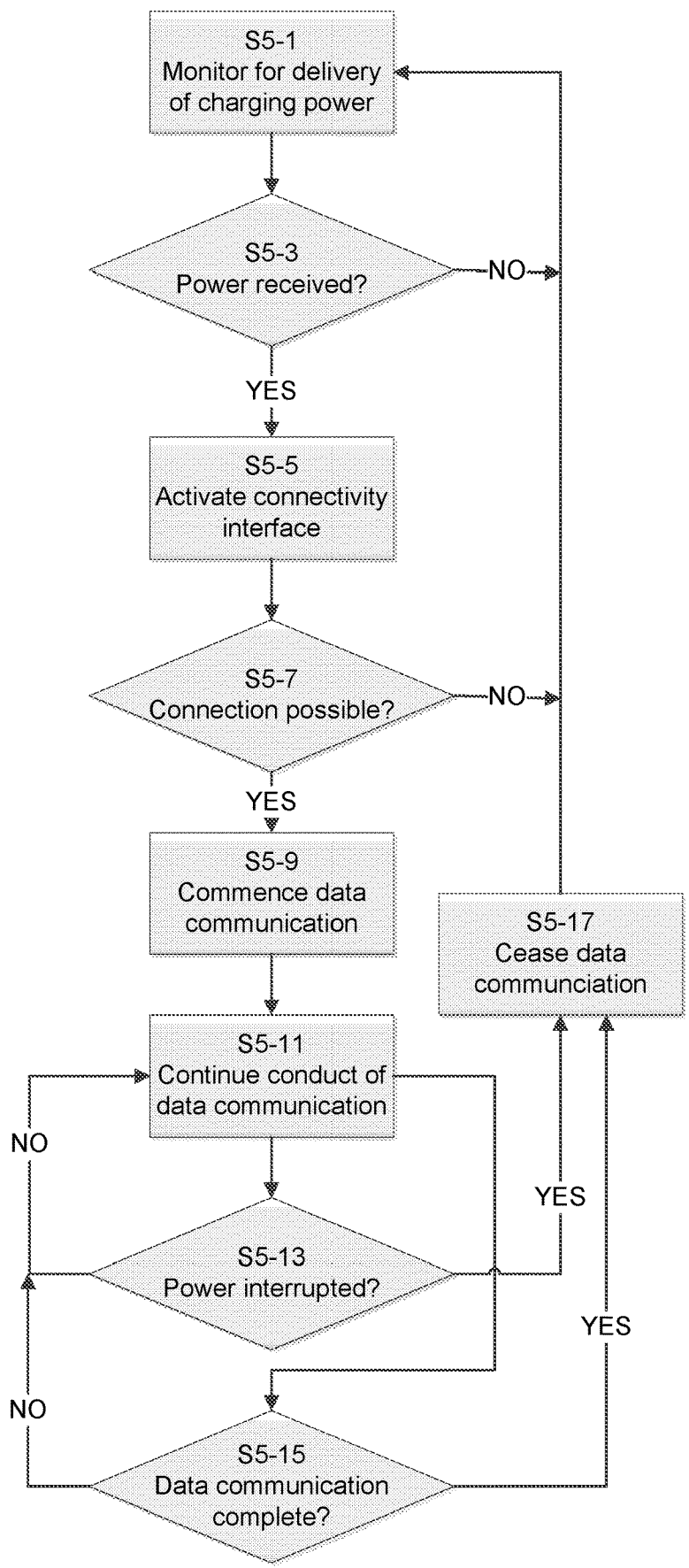
FIG. 5 provides a schematic illustration of a method of determining when to conduct data communications.

FIG. 5 illustrates a control flow for one example of management of power consumption by remote data access to preserve power for primary functionality. IN the present examples, the control flow is performed by the control circuitry 30, although in other implementations the control flow may be distributed between one or more separate control elements of or distributed within the END device.

Commencing at S5-1, the control circuitry 30 monitors the connection to the charging module 28 to detect when delivery of charging power commences. If it is detected at S5-3 that power is being received, then processing continues at S5-5, else the monitoring at S5-1 continues. The monitoring may take the form of receiving a triggering signal (such as an interrupt or simple signal level signal) on the connection from the charging module. The monitoring may also monitor for delivery of power to have occurred for a certain threshold continuous duration before providing a determination that power delivery is commenced such as to permit processing to continue to S5-5, such as to provide that the power delivery is stable and/or to permit a certain amount of power reserve to be replenishes before wireless communication commences.

After power delivery has commenced, at S5-5 the control circuitry 30 controls the connectivity interface 32 to activate. The connectivity interface then activates and searches or monitors for an available network (such as a preconfigured WLAN or telecommunications network) via which a connection to the remote service 16 could be established. At S5-7 the control circuitry decides based on a response from or behavior of the connectivity interface 32 whether a connection is possible. For example, the connectivity interface may provide a positive report of a connection possibility or the control circuitry may assume that no connection is possible if no report of a possible connection is received within a time-out period. If no connection is possible, the connectivity interface is deactivated and monitoring for power reception is resumed.

If it is determined at S5-7 that a connection is possible then at S5-9 data communication is commenced with establishing a connection to the remote service 16 for sending and/or receiving or data and/or setting information. This data communication then continues between the END device and remote service 16 at S5-11.

During conduct of the data communication, optional S5-13 may be conducted to monitor whether the power delivery has been interrupted. If S5-13 is conducted then one or more power delivery monitoring approaches may be applied. The simplest monitoring is to determine whether there is any interruption in power delivery. More complex monitoring approaches that may provide for resistance to temporary interruption caused by for example a short duration accidental removal of a power cable or a disturbance relative to a wireless charging station. For example a cessation of power delivery may be determined if an interruption in power delivery exceeds a threshold duration and/or if a threshold number of short duration interruptions occurs (e.g. where each short duration interruption is shorter than a threshold duration).

If S5-13 is conducted then in the event of no power interruption being detected then the conduct of data communication is permitted to continue at S5-13. On the other hand, if a power delivery interruption is detected then an orderly cessation of data communication may be conducted at S5-17. An orderly shutdown may comprise that transmission of a current data exchange, for example an updated settings package or a batch of reporting data is competed, but without necessarily completing transmission of an entire data or settings reserve intended for transmission but for which transmission has not yet commenced. Performing an orderly cessation of data communication may reduce the likelihood of sub-optimal performance or a malfunction which could be caused by an incomplete settings update. In other examples, where for example the END device control circuitry is resistance to such errors, the orderly cessation may be omitted, such that the connectivity interface is deactivated without regard to the state of a transmission queue or session status. Whichever approach is taken for the cessation of data communication at S5-17, the connectivity interface is deactivated and processing returns to S5-1 to continue monitoring for power supply presence.

Assuming that there is no power supply interruption that causes an early cessation of data communication, the data communication will continue until completion as identified at S5-15. Once the data communication is complete, the processing continues at S5-17 for the data communication to be ceased, but closing down an established link to the remote connection and deactivation of the connectivity interface and processing returns to S5-1 to continue monitoring for power supply presence.

Thus it is seen that the control circuitry may provide for the relatively high draw wireless interface performing distance data communication technology such as WLAN or wireless telecommunications technology to be activated when charging power is being received, so as to provide that the relatively high draw avoids depleting power reserve potentially required for the primary function of the END device.

Figure 6:
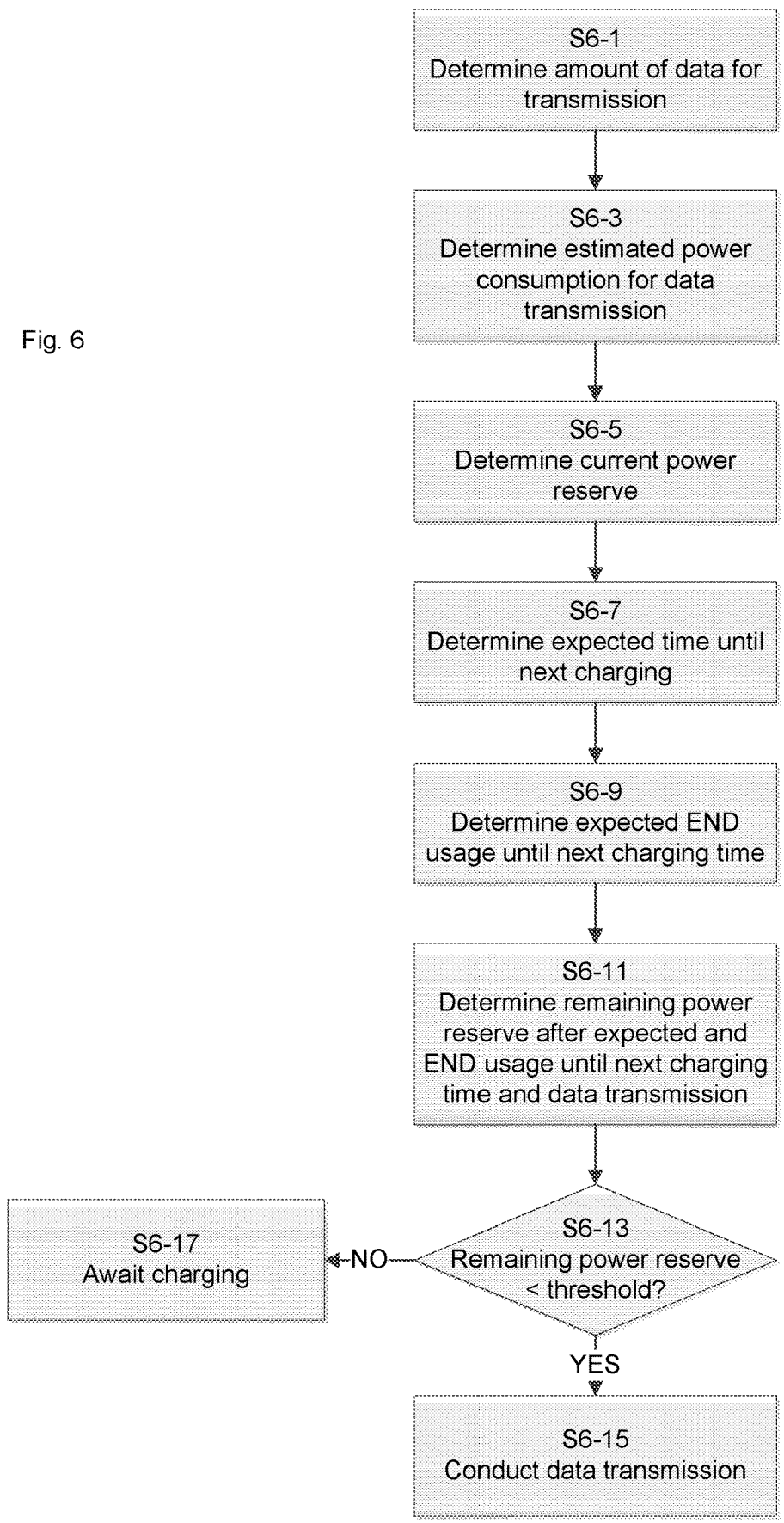
FIG. 6 provides a schematic illustration of a method of determining when to conduct data communications.

Another example of power management for data communication is illustrated with respect to FIG. 6. This example applies the same principle of avoiding data communication causing depletion of a power reserve in such manner as to impede the primary functionality of the END device. The method of FIG. 6 may be used in combination with the method of FIG. 5, so as to provide both for data communication when charging power is received (as in FIG. 5) and data communication based upon expected receipt of charging power (as explained below.

In the present example, the control circuitry includes or has access to a clock which records the passage of time, for example using a conventional time of day approach or using a time delta approach. The control circuitry also stores or has access to a memory of the END device which stores a pattern of previous usage of the END deice for the primary functionality and for receipt of charging power. By comparing the stored pattern to the clock, a prediction can be made of when charging is next expected (for example if the past data indicates that the charging has regularly occurred at around a certain time of day for a high percentage of days, or regularly occurs at an interval of a particular number (or range) of hours. Also, by comparing the pattern to clock to a prediction can be made as to how much primary functionality usage may be expected between a present time and a next expected charging time. as well as or instead of using a pattern of previous usage, a pattern of expected usage may be utilized. Such may for example be based upon a default typical usage pattern or may be representative of usage by the same user of a different END device or of other users having a similar lifestyle to the user.

By determining the amount of power usage expected for primary functionality between a present time and an expected next charging time, and by knowing the expected power draw of a data transmission session (which can be estimated based upon knowing the size of a present log of data awaiting transmission to a remote service and the expected power draw over time of the connectivity interface, a determination can be made as to whether or not data communication can be conducted without jeopardizing power availability for the expected primary functionality usage. Such a calculation may include providing a contingency power reserve below which both the predicted data communication and predicted primary functionality usage would not cause the power reserve to drop before the expected charging time.

Thus, as illustrated in FIG. 6 at S6-1 a determination is made of the amount of data for transmission, the estimated power consumption for transmission of which is determined at S6-3. This determination may include an assumed amount of data for reception, for example the amount of data included in a complete settings update that might be provided by the remote service. Also determined, at S6-5, is the current power reserve. Further, at S6-7, the expected time until next charging is determined, for example using the clock and stored usage pattern as discussed above. Another determination is made, at S6-9 of the expected END (i.e. primary functionality) usage until the next charging time. As will be appreciated, the order of S6-1 through S6-9 can be altered (or they can be conducted in parallel), excepting that S6-3 uses the result of S6-1 and S6-9 uses the result of S6-7.

Making use of all of the determinations made at S6-1 through S6-9, it is then determined, at S6-11, the amount of power reserve that would remain if the expected END usage and the data transmission were to take place before the expected next charging time. This remaining power reserve is then compared to a threshold power reserve to maintain (which as discussed above may be greater than zero so as to retain a contingency reserve in case charging is delayed) at S6-13.

If it is determined that the remaining power reserve will be greater than the threshold, then at S6-15 the data transmission is conducted, by activating the connectivity interface, establishing a connection to the remote service and communicating data as previously described. If at the time that the connectivity interface is activated there is no available network to perform the transmission, then the data transmission will be delayed. In this situation, as the power reserve position has already been determined to be acceptable, a retry for activation of the connectivity interface to establish a connection to the remote service may be carried out after a delay time without necessarily re-performing S6-1 though S6-13.

On the other hand, if at S6-13 it is determined that the remaining power reserve will be less than the threshold, then at S6-17 a decision is made to await a charging event before attempting data communication.

Thus it is seen that the control circuitry may provide for the relatively high draw wireless interface performing distance data communication technology such as WLAN or wireless telecommunications technology to be activated when doing so will not over-deplete a power reserve before an expected charging event so as to provide that the relatively high draw avoids depleting power reserve potentially required for the primary function of the END device.

The present approaches can also account that different data for transmission may have different priorities. For example, data recording usage statistics may be deemed low priority, whereas data requiring attention sooner, such as data indicating imminent depletion of a nicotine-containing liquid in the END module can be transmitted sooner so as to avoid an out-of-service condition arising without notification may be deemed higher priority. Another example of higher priority data could be operational data indicating an actual or potential malfunction such as could be caused by misuse of or damage to the END device.

To reflect such differing priorities, the control circuitry may have functionality to activate the connectivity interface for transmission of high priority data without reference to a charging and/or power reserve situation. For example, if the data indicates that the END device may become inoperable for primary functionality for a reason other than power reserve then communication of such data may be appropriately performed without regard to the power reserve situation. Also a user may have the option to use setting within the device to indicate that certain categories of data should be fed back with high priority. One example of such data might be if the user is utilizing the END device to reduce a nicotine dependency and wishes to be alerted if their delivery over a given time period exceeds a certain threshold, so as to provide an alert to the user of potential need to reduce usage of the END device.

Figure 7:
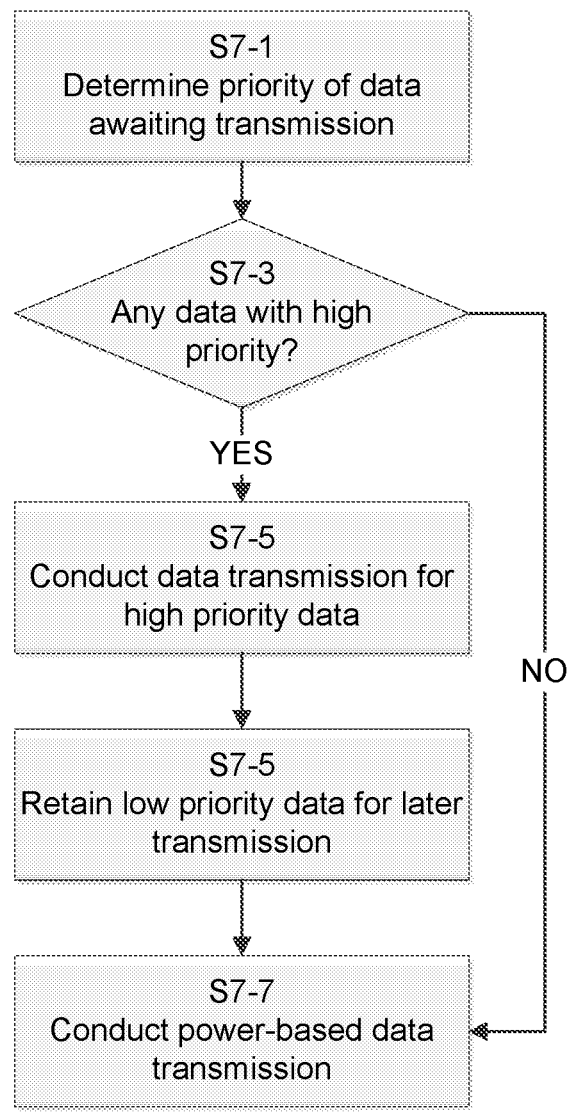
FIG. 7 provides a schematic illustration of a method of determining when to conduct data communications.

Thus, as illustrated in FIG. 7 at S7-1 a determination is made of the priority for data awaiting transmission.

A test is performed to determine whether any of the data awaiting transmission has a high priority (S7-3), and if any data does have a high priority then data transmission is conducted at S7-5 for the high priority data, by activating the connectivity interface, establishing a connection to the remote service and communicating data as previously described. If at the time that the connectivity interface is activated there is no available network to perform the transmission, then the data transmission will be delayed. In this situation, as the priority has already been determined to be high, a retry for activation of the connectivity interface to establish a connection to the remote service may be carried out after a delay time without necessarily re-performing S7-1 though S7-3.

Any data not having a high priority is retained for later transmission at S7-5. Thereafter, or if it is determined at S7-3 that no data has high priority, then at S7-7 a power-based data transmission is performed, for example based upon either or both or a charging-power-present approach as illustrated in FIG. 5 and an expected charging power approach as illustrated in FIG. 6.

Thus it is seen that the control circuitry may provide for the a high data priority to over-rule concerns about a relatively high draw wireless interface performing distance data communication technology such as WLAN or wireless telecommunications technology over-depleting a power reserve before an expected charging event so as to provide that the relatively high priority data is communicated in a timely manner.

Thus there have been described various approaches for maintaining power reserve for primary functionality of an END device by controlling activation of data communications via a distance communication interface to a remote service.

Although it has been discussed above that the END device itself contains the wireless connectivity interface, the present approaches also apply to a situation where an END device us associated with a portable docking station (for example a carry case) containing the wireless connectivity interface, where the END device has access to the wireless connectivity interface via a wired or wireless (e.g. personal are network) connection to the docking station when docked in the docking station.

From one perspective, it is seen that the described approaches therefore relate to the concept of controlling the power consumption of a simple (i.e. low processing power and limited UI) device that can directly connect to the Internet (i.e. without using a mobile application to proxy the connection). However, due to the lack of a substantial UI on the device and the potential power requirements of an interface such as WiFi, the approach has a manner of getting the device connected and only transmitting data when the power source is effectively unlimited or is predicted to be sufficient for primary functionality of the device.

The device has a WLAN or wireless telecoms interface (or works with a docking station that has such an interface). The specific example of a device is an aerosol delivery device (e-cigarette) but alternative devices may benefit from the connectivity control. The device can be programmed to connect to one or more predetermined networks, but such connection may be restricted to times when the device is charging (whether by charging cable, docking station charging or wireless charging) or when expected power reserve after the connection completes is enough to provide for an expected level of primary functionality usage before next charging. Such power-dependent restriction may be overridden for transmission of high priority data.

The programming of the predetermined networks can achieved by activating on the device a WiFi control, which causes a WiFi network to be broadcast by the device. This WiFi can be accessed by a WiFi enabled mobile device or computer of the user, which causes the user to be shown on an interface on their mobile device or computer the WiFi networks visible to the device—one or more of those visible networks can then be configured for access, which access information is stored within the device for later use.

The connections so established can then be used for upload of status/usage data from the device to a central (cloud) service and for download of settings information to the device from the service."

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the disclosure scope defined by the claims or limitations on equivalents to the claims, and that other embodiments may be utilized and modifications may be made without departing from the scope and/or spirit of the claims.

Various embodiments of the claimed scope may suitably comprise, consist of, or consist essentially of, appropriate combinations of the disclosed elements, components, features, parts, steps, means, etc, other than those specifically described herein. In addition, this disclosure may include other concepts not presently claimed, but which may be claimed in future either in combination with or separately to the presently claimed features.

For instance, although the specification has been described with reference to electronic nicotine delivery "END" devices, it will be appreciated that the teaching of the specification might be also used with, more general, aerosol delivery devices which do not necessarily contain, or use, nicotine. In such more general aerosol delivery devices, the aerosol delivery device (which might in some embodiments comprise an electronic cigarette (e-cigarette), and/or an END device) may contain an aerosol precursor material, such as a reservoir of a source liquid containing a formulation, typically but not necessarily including nicotine, or a solid material such a tobacco-based product, from which an aerosol is generated for inhalation by a user, for example through heat vaporization. Thus, an aerosol delivery device will typically comprise a vaporizer, e.g. a heating element, arranged to vaporize a portion of precursor material to generate an aerosol in an aerosol generation region of an air channel through the aerosol delivery device. As a user inhales on the device and electrical power is supplied to the vaporizer, air is drawn into the device through one or more inlet holes and along the air channel to the aerosol generation region, where the air mixes with the vaporized precursor material and forms a condensation aerosol. The air drawn through the aerosol generation region continues along the air channel to a mouthpiece opening, carrying some of the aerosol with it, and out through the mouthpiece opening for inhalation by the user.

In a similar vein, where the specification makes reference to an END module, it will be appreciated that in some broader embodiments not necessarily using nicotine, the END module may be an aerosol delivery device module. Put differently, in some narrower embodiments, such an aerosol delivery device module may comprise an END module

The invention claimed is:

1. An aerosol delivery device comprising:
    a wireless local area network "WLAN" or wireless telecommunications connectivity interface configured to establish a wireless data connection to a WLAN or wireless telecommunications network to provide data connectivity from the aerosol delivery device to a remote management service;
    a charging connector configured to receive power input for recharging a power source of the aerosol delivery device; and
    circuitry configured to selectively activate the connectivity interface in response to expected receipt of power at a predetermined time, or continuous receipt of power for a time period greater than a threshold duration via the charging connector,
    a memory storing a historical or expected usage pattern of the aerosol delivery device;
    a clock indicating a present time; and
    wherein the circuitry is configured to selectively activate the connectivity interface in response to expected receipt of power at a predetermined time by comparing the stored usage pattern to the present time to determine when a period of expected receipt of power via the charging connector occurs.

2. The aerosol delivery device of claim 1, further comprising an aerosol delivery device module configured to generate an aerosol upon activation of the aerosol delivery device module, and a charging module configured to receive power input from the charging connector, wherein the connectivity interface is comprised within the aerosol delivery device module or the charging module.

3. The aerosol delivery device of claim 2, wherein the device is configured to generate an aerosol containing nicotine.

4. The aerosol delivery device of claim 2, wherein the aerosol delivery device module comprises an electronic nicotine delivery "END" module.

5. The aerosol delivery device of claim 1, wherein the connectivity interface comprises a Wi-Fi interface.

6. The aerosol delivery device of claim 1, wherein the connectivity interface comprises a wireless telephony connectivity interface.

7. The aerosol delivery device of claim 1, wherein the connectivity interface is configured to connect only to preconfigured networks.

8. The aerosol delivery device of claim 1, wherein the connectivity interface is configured to be selectively activated as an access point to provide a user interface for configuring the aerosol delivery device.

9. The aerosol delivery device of claim 8, wherein the connectivity interface is configured to connect only to preconfigured WLAN networks, and wherein the user interface is configured to accept data defining a WLAN network, and to save accepted data defining a WLAN network as a preconfigured WLAN network.

10. The aerosol delivery device of claim 9, wherein the connectivity interface is configured to connect only to preconfigured wireless telecommunications networks, and wherein the user interface is configured to accept data defining a WLAN network, and to save accepted data defining a wireless telecommunications network as a preconfigured wireless telecommunications network.

11. The aerosol delivery device of claim 1, wherein the charging connector comprises a wired connector.

12. The aerosol delivery device of claim 1, wherein the charging connector comprises a wireless charging receiver.

13. The aerosol delivery device of claim 1, wherein the circuitry configured to selectively activate the connectivity interface is further configured to deactivate the connectivity interface responsive to detecting a cessation of receipt of power via the charging connector.

14. The aerosol delivery device of claim 13, wherein the circuitry is further configured to deactivate the connectivity interface responsive to detecting a cessation of receipt of power via the charging connector for a time period greater than a threshold duration, and/or responsive to detecting a predetermined number of interruptions in receipt of power via the charging connector, where each interruption has a duration less than a predetermined threshold duration.

15. The aerosol delivery device of claim 1, wherein the remote management service is an Internet-hosted management service.

16. The aerosol delivery device of claim 1, further comprising circuitry configured to compare the stored usage pattern to the present time to determine whether an expected power consumption caused by activation of the connectivity interface in combination with an expected power consumption of aerosol delivery device usage of the aerosol delivery device specified in the storage usage pattern would cause depletion of the power source prior to an expected next receipt of power, and to cause activation of the connectivity interface in response determining that such depletion would not occur.

17. The aerosol delivery device of claim 16, wherein the activation of the connectivity interface is caused in response to determining that a threshold percentage power would remain in the power source above a level indicating depletion.

18. The aerosol delivery device of claim 1, further comprising circuitry configured to selectively activate the connectivity interface in response to detection of information queued for transmission having a high priority.

19. The aerosol delivery device of claim 18, further configured to utilize the circuitry configured to selectively activate the connectivity interface in response to expected or ongoing receipt of power via the charging connector for transmission of information queued for delivery having a low priority and/or according to a predetermined activation schedule.

* * * * *